United States Patent
Fujiwara

(10) Patent No.: US 12,036,625 B2
(45) Date of Patent: Jul. 16, 2024

(54) JOINING STRUCTURE AND JOINING METHOD

(71) Applicant: Panasonic Intellectual Property Management Co., Ltd., Osaka (JP)

(72) Inventor: Junji Fujiwara, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 747 days.

(21) Appl. No.: 17/012,477

(22) Filed: Sep. 4, 2020

(65) Prior Publication Data

US 2020/0398375 A1 Dec. 24, 2020

Related U.S. Application Data

(63) Continuation of application No. PCT/JP2019/007395, filed on Feb. 26, 2019.

(30) Foreign Application Priority Data

Mar. 5, 2018 (JP) ................................. 2018-038907

(51) Int. Cl.
*B23K 26/21* (2014.01)
*B23K 26/211* (2014.01)
(Continued)

(52) U.S. Cl.
CPC ............ *B23K 26/21* (2015.10); *B23K 26/211* (2015.10); *B23K 26/22* (2013.01); *B23K 26/323* (2015.10);
(Continued)

(58) Field of Classification Search
CPC .. B23K 2103/18; B23K 26/21; B23K 26/211; B23K 26/22; B23K 26/323; B23K 26/342; B23K 37/0408; B23K 9/04
(Continued)

(56) References Cited

U.S. PATENT DOCUMENTS

2014/0294489 A1* 10/2014 Sakai ..................... B23K 26/22
                                                                403/267
2019/0047087 A1   2/2019 Kawamoto et al.
(Continued)

FOREIGN PATENT DOCUMENTS

EP         3 437 784      2/2019
JP         2016-68096     5/2016
(Continued)

OTHER PUBLICATIONS

Extended European Search Report issued Mar. 26, 2021 in corresponding European Patent Application No. 19764135.0.
(Continued)

*Primary Examiner* — Dana Ross
*Assistant Examiner* — Joseph W Iskra
(74) *Attorney, Agent, or Firm* — Wenderoth, Lind & Ponack, L.L.P.

(57) ABSTRACT

A first member and a second member are formed of metal materials of the same type and a third member is formed of a material of a different type that is difficult to weld to the first member and the second member. The first member and the second member are laser welded to each other such that respective regions of the first member and the second member which correspond to the spacer are welded via a through hole with the third member interposed therebetween. The spacer is formed of a filler material jointed to the second member by arc welding and is formed such that a central portion protrudes toward the first member more than an outer peripheral portion.

6 Claims, 5 Drawing Sheets

(51) Int. Cl.
    *B23K 26/22*     (2006.01)
    *B23K 26/323*     (2014.01)
    *B23K 37/04*     (2006.01)
    *B23K 103/18*     (2006.01)

(52) U.S. Cl.
    CPC ...... *B23K 37/0408* (2013.01); *B23K 2103/18* (2018.08)

(58) Field of Classification Search
    USPC .................................................. 219/121.63
    See application file for complete search history.

(56) References Cited

U.S. PATENT DOCUMENTS

| | | |
|---|---|---|
| 2019/0076962 A1 | 3/2019 | Kawamoto et al. |
| 2019/0257333 A1 | 8/2019 | Fujiwara et al. |

FOREIGN PATENT DOCUMENTS

| | | | |
|---|---|---|---|
| JP | 2016-155153 | | 9/2016 |
| JP | 2016155153 | * | 9/2016 |
| WO | 2017/169998 | | 10/2017 |
| WO | 2017/170517 | | 10/2017 |
| WO | 2017/170518 | | 10/2017 |
| WO | 2018/030272 | | 2/2018 |
| WO | 2018/042680 | | 3/2018 |

OTHER PUBLICATIONS

Search Report issued Feb. 14, 2022 in corresponding Chinese Patent Application No. 201980017187.7.
International Search Report issued May 21, 2019 in International (PCT) Application No. PCT/JP2019/007395.
Office Action issued Mar. 24, 2022 in counterpart Indian Application No. 202047040967.
Office Action issued Jul. 7, 2023 in corresponding European patent application No. 19764135.0 (5 pages).

* cited by examiner

JOINING STRUCTURE AND JOINING METHOD

CROSS-REFERENCE TO RELATED APPLICATIONS

This is a continuation of International Application No. PCT/JP2019/007395 filed on Feb. 26, 2019, which claims priority to Japanese Patent Application No. 2018-038907 filed on Mar. 5, 2018. The entire disclosures of these applications are incorporated by reference herein.

BACKGROUND

The present disclosure relates to a joining structure and a joining method.

Conventionally, joining structures in which a first material and a second material that are formed of metal materials of the same type which can be welded to each other are welded in a state in which a third material that is difficult to weld to the first material and the second material is interposed between the first material and the second material, and thus, the third material as a material of a different type is compressed and fixed have been known (see, for example, International Patent Publication No. WO2017/170517).

Incidentally, in the invention of Patent Document 1, a protrusion extruded in a tapered shape to have an embossed shape is formed in each of a first material and a second material, the protrusions are arranged so as to face each other to reduce a gap therebetween, and then, laser welding is performed.

In general, the protrusions are formed by drawing by performing press work. When the first and second materials are pressed, depending on a clearance between a punch serving as a projecting mold and a die serving as a recessed mold that are used in drawing, for example, in a case in which the clearance is too narrow, or the like, the first and second material are partially drawn too much, so that a portion that is much thinner than a plate thickness is formed, and as a result, joining strength is reduced in some cases.

In view of the foregoing, the present disclosure has been devised, and it is therefore an object of the present disclosure to enable joining of metal materials of the same type and a material of a different type without reducing thicknesses of the metal materials.

SUMMARY

Aspects of the present disclosure are directed to a joining structure including a first member formed of a metal material, a second member formed of a metal material of a same type as that of the first member which can be welded to the first member, and a third member formed of a material that is difficult to weld to the first member and the second member, the first member, the second member, and the third member being jointed to each other, and the following solutions have been devised.

That is, a first aspect is characterized in that the second member is provided with a spacer formed of a filler material that is joined to a surface of the second member which faces the first member and formed such that a central portion protrudes toward the first member more than an outer peripheral portion, a through portion in which the spacer is inserted is formed in the third member, and the first member is welded to at least the spacer, in a state where the spacer is inserted into the through portion and the third member is interposed between the first member and the second member.

In the first aspect, the first member and the second member are formed of metal materials of the same type and the third material is formed of a material of a different type that is difficult to weld to the first member and the second member. The first member and the second member are welded to each other such that respective regions of the first member and the second member which correspond to the spacer are welded via the through portion with the third member interposed therebetween. The spacer is formed of the filler material that is joined to the second member such that a central portion protrudes toward the first member more than the outer peripheral portion.

Thus, the first member, the second member, and the third member can be joined with each other in a state in which the third member that is a material of a different type is interposed between the first member and the second member without reducing thicknesses of the first member and the second member that are metal materials of the same type.

Specifically, in a case in which welding is performed in a state in which the third member is interposed between the first member and the second member, the first member and the second member are disposed so as to be separated from each other by a distance corresponding to a thickness of the third member, and therefore, a gap is too large, so that laser welding cannot be performed.

For this reason, conventionally, each of the first member and the second member is pressed to form a protrusion having an embossed shape, the respective protrusions are arranged to face each other to reduce the gap, and then, laser welding is performed.

However, there is a probability that, when the first member and the second member are pressed, the first member and the second member are partially drawn and a portion that is much thinner than a plate thickness is formed, so that joining strength is reduced.

Therefore, in this aspect, the spacer formed of the filler material is provided, for example, by performing arc welding using a consumable electrode or a filler wire or laser filler welding using a filler wire on the second member. Thus, the gap between the first member and the second member is reduced by an amount corresponding to the height of the spacer without reducing the thickness of the second member, and the first member and the second member can be joined by laser welding.

The central portion of the spacer protrudes more than the outer peripheral portion, and therefore, in a state in which the spacer is inserted into the through portion, a gap is provided in a periphery of the spacer, that is, between the spacer and an inner peripheral wall of the through portion. Moreover, deformation of the first member when the first member and the second member are laser-welded and a molten metal is solidified and shrunk is allowed by the gap in the periphery of the spacer.

Thus, the third member interposed between the first member and the second member can be compressed and fixed.

A second aspect is characterized in that, in the joining structure of the first aspect, the first member is welded to at least the spacer in a state in which the region of the first member which corresponds to the spacer is warped toward the spacer.

In the second aspect, the first member and the second member are joined in a state in which the region of the first member which corresponds to the spacer is warped. That is, when the first member and the second member are laser-welded, the molten metal is solidified and shrunk and the first member is warped, and thus, a gap between the first member and the spacer is reduced, so that the third member interposed therebetween can be compressed and fixed.

A third aspect is directed to a joining method, in which a first member formed of a metal material, a second member formed of a metal material of a same type as that of the first member which can be welded to the first member, and a third member formed of a material that is difficult to weld to the first member and the second member are joined to each other, and is characterized in that a through portion is formed in the third member, and the joining method includes steps of providing a spacer formed such that a central portion protrudes more than an outer peripheral portion by melting a filler material to join the filler material to the second member, interposing the third member between the first member and the second member in a state where the spacer is inserted into the through portion of the third member, and welding the first member to at least the spacer by radiating laser light to a region of the first member which corresponds to the spacer.

In the third aspect, the first member and the second member are formed of metal materials of the same type and the third material is formed of a material of a different type that is difficult to weld to the first member and the second member. The spacer formed such that the central portion protrudes more than the outer peripheral portion is provided by melting the filler material to join the filler material to the second member, and the first member is laser-welded to at least the spacer in a state in which the third member is interposed between the first member and the second member.

Thus, the first member, the second member, and the third member can be joined with each other in a state in which the third member that is a material of a different type is interposed between the first member and the second member without reducing thicknesses of the first member and the second member that are metal materials of the same type.

A fourth aspect is characterized in that, in the joining method of the third aspect, in the step of providing the spacer, the filler material is melted in the through portion in a state in which the third material is placed to overlap the second member.

In the fourth aspect, the second member and the third member are placed to overlap each other and the filler material is melted in the through portion. Thus, the melted filler material can be regulated by the inner peripheral wall of the through portion of the third member so as not to spread over a surface of the second member 20, so that a height of the spacer portion can be easily set to a desired height.

A fifth aspect is characterized in that, in the joining method of the third or fourth aspect, in the step of providing the spacer, the filler material is melted such that a height of the central portion of the spacer is larger than a thickness of the third member, and the step of interposing the third member between the first member and the second member is performed before the filler material is solidified.

In the fifth aspect, the filler material is melted such that the height of the central portion of the spacer is larger than the thickness of the third member and, before the filler material is solidified, the third member is interposed between the first member and the second member.

Thus, even in a case in which the height of the central portion of the spacer exceeds the thickness of the third member, the central portion of the spacer can be deformed so as to fit in the through portion by pressing the first member against the spacer before the filler is solidified. Thereafter, the first member and the second member can be joined to each other with the third member interposed between the first member and the second member by laser-welding the first member and the second member.

A sixth aspect is characterized in that, in the joining method of the fifth aspect, in the step of welding the first member to at least the spacer, when temperature of the spacer is equal to or lower than a melting point and equal to or higher than 100° C., laser light is radiated.

In the sixth aspect, when the temperature of the spacer is equal to or lower than the melting point and equal to or higher than 100° C., that is, the spacer is at a red heat, laser welding is performed, so that excellent shrinkability of the molten metal when the molten metal is solidified is achieved.

A seventh aspect is characterized in that the joining method of the third aspect further includes a step of preparing a molding jig provided with a molding hole passing through the molding jig in a thickness direction and having a hole diameter that gradually increases from one surface to another surface and formed of a material a melting point of which is higher than that of the filler material, and in the step of providing the spacer, in a state in which a surface of the molding jig at which the hole diameter of the molding hole is larger is placed on the second member, the filler material is melted in the molding hole, and thereafter, the molding jig is removed.

In the seventh aspect, in a state in which the molding jig formed of a material a melting point of which is higher than that of the filler material is placed to overlap the second member, the filler material is melted in the molding hold. For example, in a case in which the third member is formed of an aluminum material or a resin material that is deformed or melted when the aluminum material or the resin material touches a high temperature filler material, or in like case, the spacer may be formed in advance using the molding jig.

Moreover, a surface of the molding jig at which the hole diameter of the molding hole is larger is placed on the second member, and thus, after the filler material is solidified, the molding jig can be easily removed.

According to the aspects of the present disclosure, metal materials of the same type and a material of a different type can be joined to each other without reducing thicknesses of the metal materials.

DETAILED DESCRIPTION

Embodiments of the present disclosure will be described below with reference to the accompanying drawings. Note that the following description of preferred embodiments describes mere examples by nature and is not intended to limit the scope, application, or use of the present disclosure.

First Embodiment

Figure 1:
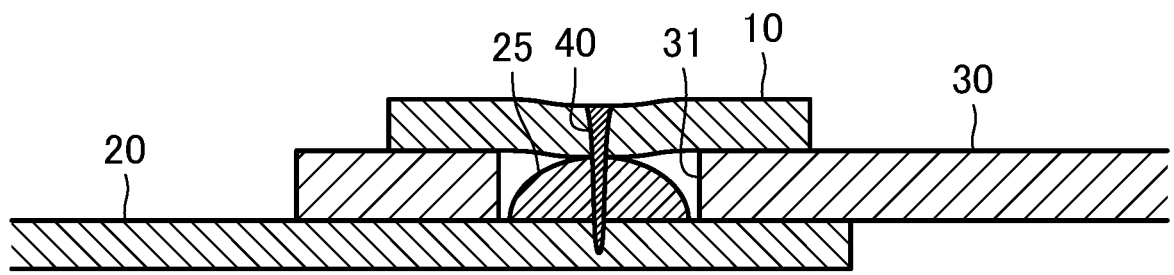
FIG. 1 is a side cross-sectional view illustrating a joining structure according to a first embodiment.

As illustrated in FIG. 1, in a joining structure according to this embodiment, a first member 10, a second member 20, and a third member 30 are joined to each other with the third member 30 interposed between the first member 10 and the second member 20.

The first member 10 is a plate-like-member formed of a metal material. The second member 20 is a plate-like member formed of a metal material of the same type as that of the first member 10 which can be welded to the first member 10. In the second member 20, a spacer 25 is provided on a surface that faces the first member 10.

The spacer 25 is formed of a filler material that is joined to the second member 20. The spacer 25 is formed in a curved shape in which a central portion protrudes toward the first member 10 more than an outer peripheral portion.

The third member 30 is a plate-like member formed of a material that is difficult to weld to the first member 10 and the second member 20, and a through hole 31 as a through portion is formed therein. Note that, although the through hole 31 is provided as the through portion, the through portion may be a through groove.

In this case, the spacer 25 is inserted in the through hole 31 of the third member 30. Because the spacer 25 is inserted in the through hole 31 of the third member 30 in the above described manner, the through hole 31 has an effect of restraining relative positional displacement of the second member 20 with respect to the second member 20.

In preforming joining, the third member 30 that is a material of a different type is disposed so as to be interposed between the first member 10 and the second member 20 that are metal materials of the same type.

As used herein, the "metal materials of the same type" mean metals that can be welded to each other and may be not only the same material but also metal materials, such as ferrous metal materials, nonferrous metal materials, or the like, which have a good weld joining property. In other words, the "metal materials of the same type" mean materials of the same type which have good compatibility in welding.

Specifically, combinations of the first member 10 and the second member 20 in performing welding are as follows. For example, as combinations of ferrous metal materials, there are combinations of soft steel and soft steel, stainless and stainless, soft steel and high tensile steel, high tensile steel and high tensile steel, and the like. As combinations of nonferrous metal materials, there are combinations of aluminum and aluminum, aluminum and aluminum alloy, aluminum alloy and aluminum alloy, and the like.

The third member 30 as a material of a different type is a different material from those of the first member 10 and the second member 20 as metal materials of the same type and is a material that is difficult to weld to the first member 10 and the second member 20.

For example, in a case in which the first member 10 and the second member 20 as metal materials of the same type are ferrous metal materials, the third member 30 as a material of a different type is a nonferrous metal material, such as a copper material, an aluminum material, or the like, which has a low laser light absorptivity and is difficult to laser weld. For example, examples of a material of a different type from the metal materials include a resin material, such as carbon fiber reinforced plastics (CFRP), polyethylene terephthalate (PET), or the like.

Note that, in the following description, a case in which a soft steel material is used as the first member 10 and the second member 20, an aluminum material is used as the third member 30, and a soft steel material is used as a filler material will be described.

The first member 10 and the second member 20 are joined by laser welding. Specifically, laser welding is performed by radiating laser light L toward a region of the first member 10 which corresponds to the spacer 25 from an upper side in a plate thickness direction.

When laser welding is performed by radiating the laser light L to the first member 10, a welded portion 40 is formed during welding. At this time, a molten metal of the welded portion 40 of the first member 10 and the second member 20 is solidified and shrunk, and therefore, the region of the first member 10 which corresponds to the spacer 25 is warped toward the spacer 25 and a gap between the first member 10 and the spacer 25 is reduced.

Thus, the first member 10 and the second member 20 as metal materials of the same type are melted and joined via the spacer 25 and then solidified and shrunk, and the third member 30 as a material of a different type interposed therebetween is compressed and fixed.

Figure 2:
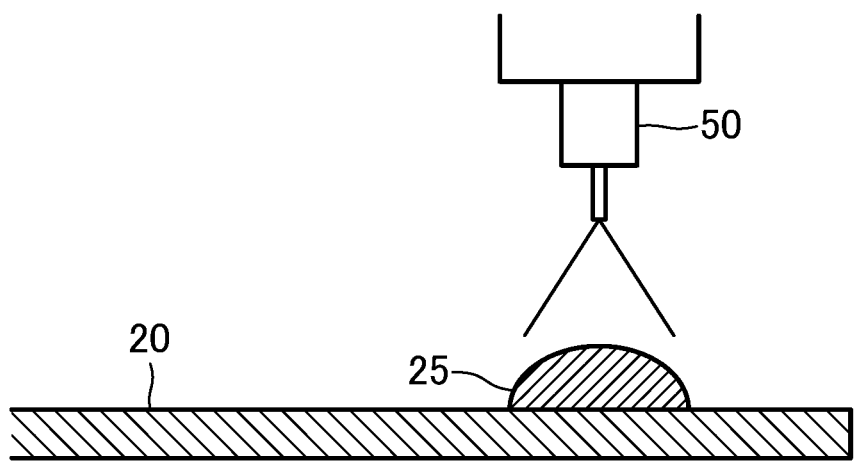
FIG. 2 is a side cross-sectional view illustrating a state in which a spacer is provided in a second member by arc welding.

A joining method for joining the first member 10, the second member 20, and the third member 30 will be described below. As illustrated in FIG. 2, first, arc welding ($CO_2$, MAG, TIG) is performed on the second member 20 using an arc welding machine 50, and thus, the spacer 25 formed of a filler material is provided on a surface of the second member 20. The spacer 25 is formed in a curved shape protruding upward by a surface tension acting during welding. Therefore, the central portion of the spacer 25 is higher than the outer peripheral portion thereof.

Note that, in performing arc welding, a feeding amount of the filler material needs to be adjusted such that an outer diameter of a lower peripheral edge portion of the spacer 25 is smaller than a hole diameter of the through hole 31 of the third member 30 and a height of the central portion of the spacer 25 is smaller than a plate thickness of the third member 30.

Figure 3:
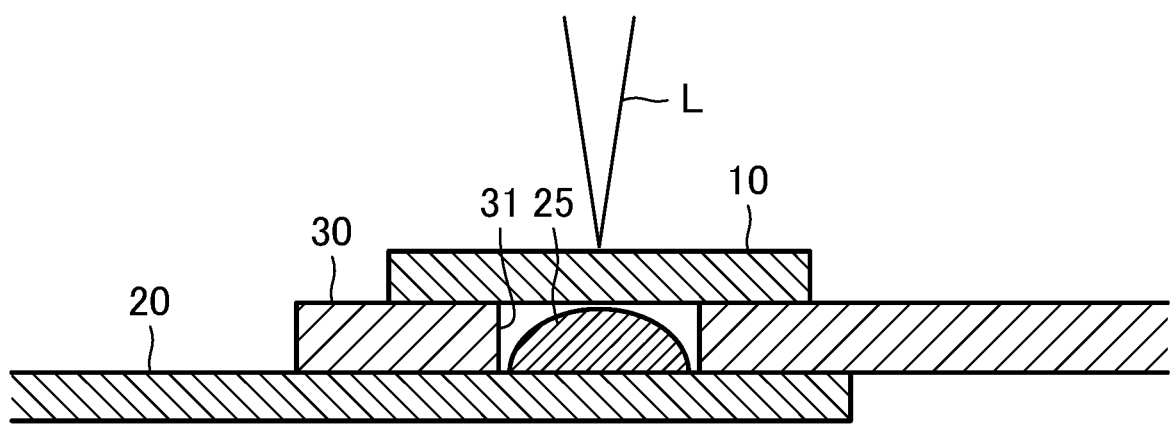
FIG. 3 is a side cross-sectional view illustrating the joining structure before laser welding.

Next, as illustrated in FIG. 3, with the spacer 25 inserted in the through hole 31 of the third member 30, the third member 30 is interposed between the first member 10 and the second member 20. In this case, the height of the central portion of the spacer 25 is smaller than the plate thickness of the third member 30, and therefore, a gap is provided between the first member 10 and the spacer 25.

Then, the laser light L is radiated to the region of the first member 10 which corresponds to the spacer 25, and thus, the welded portion 40 that is continuous to the first member 10, the spacer 25, and the second member 20 is formed. Thus, the first member 10 and the second member 20 are joined via the spacer 25.

At this time, as illustrated in FIG. 1, the molten metal of the welded portion 40 is solidified and shrunk, so that the first member 10 is warped, and thus, the gap between the first member 10 and the spacer 25 is reduced. Therefore, the third member 30 as a material of a different type can be compressed and fixed between the first member 10 and the second member 20 that are metal materials of the same type.

Second Embodiment

A joining structure according to a second embodiment will be described with reference to FIG. 4 to FIG. 6. Note that the same components as those in the first embodiment will be denoted by the same reference symbols as those in the first embodiment and only different points will be described below.

Figure 4:
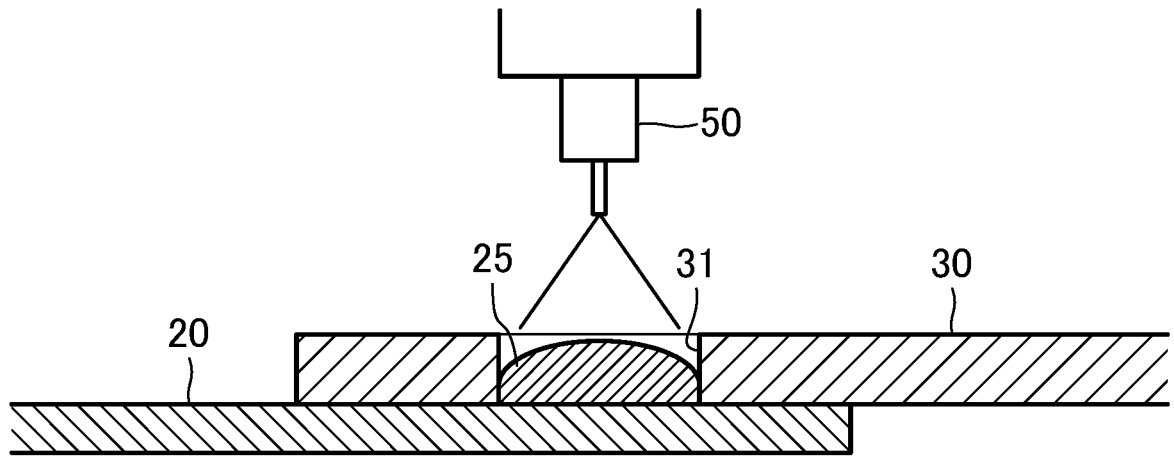
FIG. 4 is a side cross-sectional view illustrating a state in which a spacer is provided in a second member by arc welding in a joining structure according to a second embodiment.

As illustrated in FIG. 4, first, the third member 30 is placed to overlap the second member 20. Then, a filler material is melted in the through hole 31 of the third member 30 using the arc welding machine 50, and thus, the spacer 25 formed of the filler material is provided on a surface of the second member 20. At this time, the melted filler material can be regulated by an inner peripheral wall of the through hole 31 of the third member 30 so as not to spread on the surface of the second member 20, and therefore, the spacer 25 can be easily formed to have a desired height.

The spacer 25 is formed in a curved shape protruding upward by a surface tension acting during welding. Therefore, the height of the central portion of the spacer 25 is larger than that of the outer peripheral portion.

Note that, in performing arc welding, the feeding amount of the filler material needs to be adjusted such that the height of the central portion of the spacer 25 is smaller than the plate thickness of the third member 30.

Figure 5:
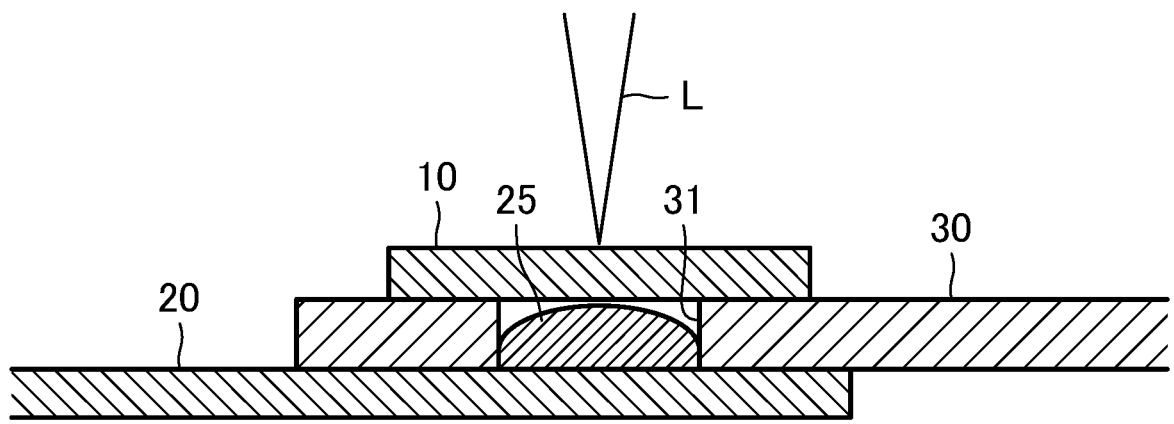
FIG. 5 is a side cross-sectional view illustrating the joining structure before laser welding.

Next, as illustrated in FIG. 5, the first member 10 is placed to overlap an upper surface of the third member 30 and, with the spacer 25 inserted in the through hole 31 of the third member 30, the third member 30 is interposed between the first member 10 and the second member 20. In this case, the height of the central portion of the spacer 25 is smaller than the plate thickness of the third member 30, and therefore, a gap is provided between the first member 10 and the spacer 25.

Then, the laser light L is radiated to the region of the first member 10 which corresponds to the spacer 25, and thus, the welded portion 40 that is continuous to the first member 10, the spacer 25, and the second member 20 is formed. Thus, the first member 10 and the second member 20 are joined via the spacer 25.

Figure 6:
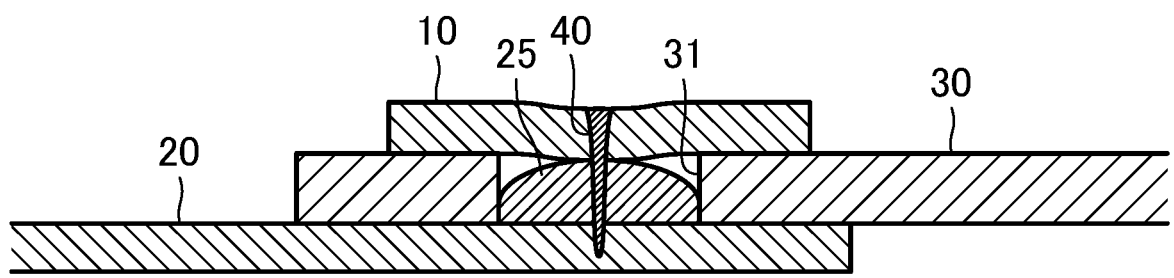
FIG. 6 is a side cross-sectional view illustrating the joining structure after welding.

At this time, as illustrated in FIG. 6, the molten metal of the welded portion 40 is solidified and shrunk, so that the first member 10 is warped, and thus, the gap between the first member 10 and the spacer 25 is reduced. Therefore, the third member 30 as a material of a different type can be compressed and fixed between the first member 10 and the second member 20 that are metal materials of the same type.

Third Embodiment

A joining structure according to a third embodiment will be described with reference to FIG. 7 to FIG. 9. Note that the same components as those in the first embodiment will be denoted by the same reference symbols as those in the first embodiment and only different points will be described below.

Figure 7:
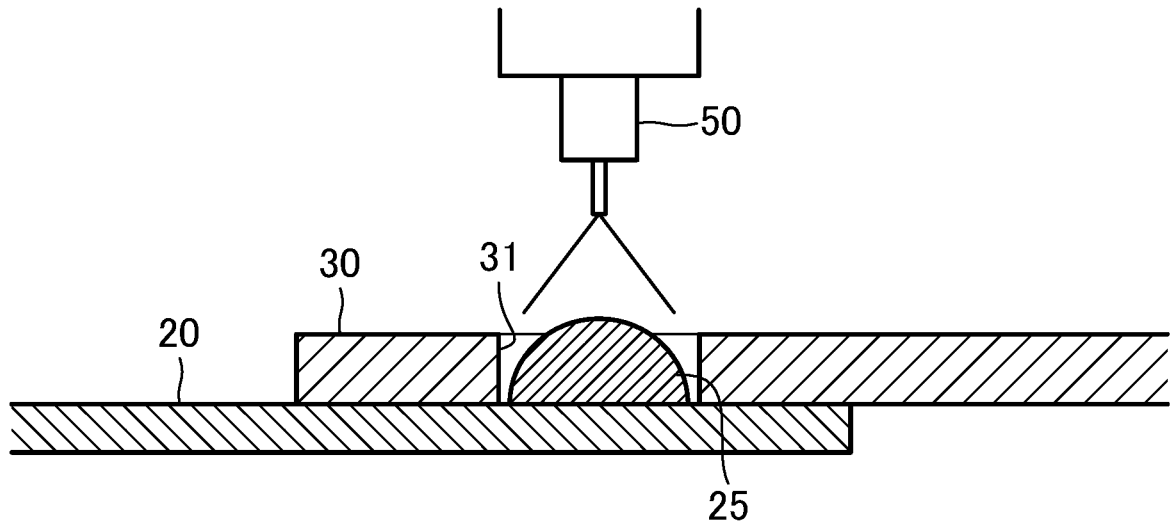
FIG. 7 is a side cross-sectional view illustrating a state in which a spacer is provided in a second member by arc welding in a joining structure according to a third embodiment.

As illustrated in FIG. 7, first, the third member 30 is placed to overlap the second member 20. Then, a filler material is melted in the through hole 31 of the third member 30 using the arc welding machine 50, and thus, the spacer 25 formed of the filler material is provided on a surface of the second member 20.

The spacer 25 is formed in a curved shape protruding upward by a surface tension acting during welding. Therefore, the central portion of the spacer 25 is higher than the outer peripheral portion.

In this case, in performing arc welding, the feeding amount of the filler material is adjusted such that the height of the central portion of the spacer 25 is larger than the plate thickness of the third member 30. For example, the central portion of the spacer 25 is higher than a level at which a plate surface of the third member 30 is located by about 0.1 to 1 mm.

Figure 8:
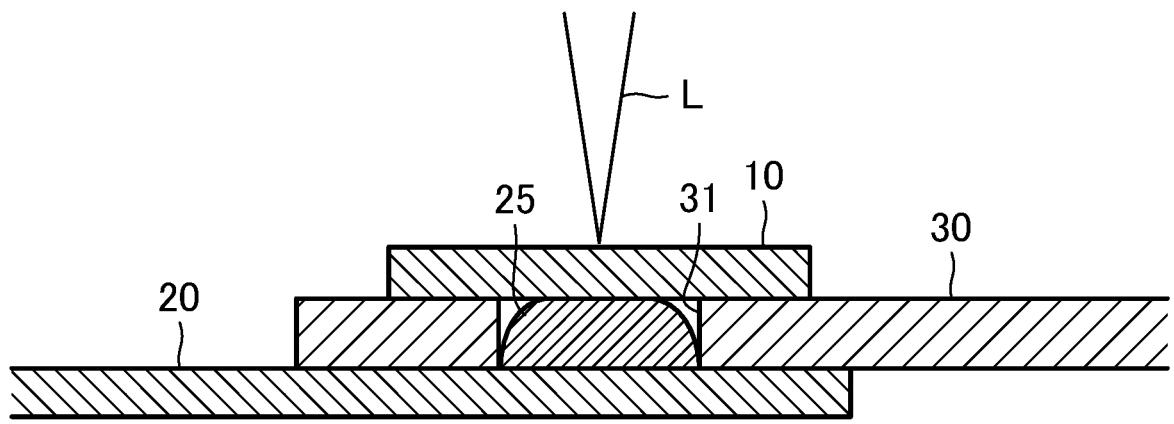
FIG. 8 is a side cross-sectional view illustrating the joining structure before laser welding.
Figure 9:
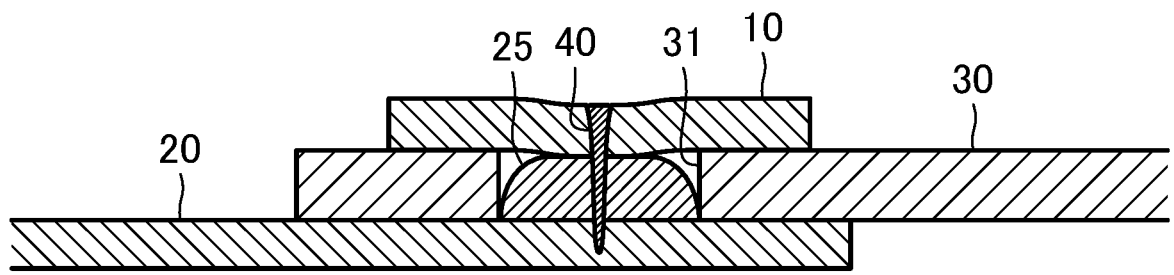
FIG. 9 is a side cross-sectional view illustrating the joining structure after welding.

Next, as illustrated in FIG. 8, before the melted filler material is solidified (for example, a solidification time is two to three seconds), the first member 10 is placed on the upper surface of the third member 30 and the first member 10 is pressed against the spacer 25. Thus, the central portion of the spacer 25 is deformed so that the spacer 25 fits in the through hole 31 of the third member 30.

Then, the laser light L is radiated to the region of the first member 10 which corresponds to the spacer 25, and thus, the welded portion 40 that is continuous to the first member 10, the spacer 25, and the second member 20 is formed. Thus, the first member 10 and the second member 20 are joined via the spacer 25.

In this case, the laser light L is radiated when temperature of the spacer 25 is equal to or lower than a melting point and equal to or lower than 100° C., that is, when the spacer 25 is at a red heat. Thus, as illustrated in FIG. 9, excellent shrinkability of the molten metal when the molten metal is solidified is achieved, and the molten metal of the welded portion 40 is solidified and shrunk, and the first member 10 is warped, so that the third member 30 that is a material of a different type can be compressed and fixed between the first member 10 and the second member 20 that are metal materials of the same type.

Fourth Embodiment

A joining structure according to a fourth embodiment will be described with reference to FIG. 10 to FIG. 12. Note that the same components as those in the first embodiment will be denoted by the same reference symbols as those in the first embodiment and only different points will be described below.

Figure 10:
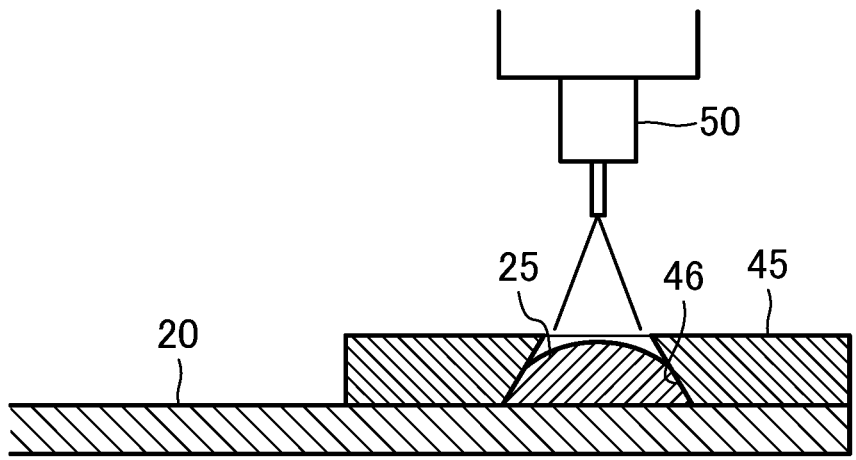
FIG. 10 is a side cross-sectional view illustrating a state in which a spacer is provided in a second member by arc welding in a joining structure according to a fourth embodiment.

As illustrated in FIG. 10, a molding jig 45 used for forming the spacer 25 is prepared. The molding jig 45 is a plate-like member formed of a material a melting point of which is higher than that of the filler material. For example, in a case in which a soft steel material a melting point of which is about 1600° C. is used as the filler material, the molding jig 45 may be formed of tungsten, molybdenum, or the like, a melting point of which is 3000° C. or more.

Thus, for example, even in a case in which the third member 30 is formed of an aluminum material (a melting point of which is about 660° C.) that is deformed or melted when the aluminum material touches a high temperature filler material, the spacer 25 can be formed in advance using the molding jig 45.

In the molding jig 45, a molding hole 46 that passes through the molding jig 45 in a thickness direction is provided. The molding hole 46 is formed in a tapered shape in which a hole diameter gradually increases from an upper surface of the molding jig 45 to a lower surface thereof. In this case, the hole diameter of the molding hole 46 at a lower surface is smaller than a hole diameter of the through hole 31 of the third member 30 (for example, by about 0.5 mm).

Note that the shape of the molding hole 46 is not limited to the tapered shape but may be a shape with which the molding jig 45 can be easily removed after the filler material is solidified. For example, the molding hole 46 may be formed such that a cross section of the molding hole 46 is circular arc-shaped.

Then, in a state in which a surface of the molding jig 45 at which the hole diameter of the molding hole 46 is larger is placed on the second member 20, using the arc welding machine 50, the filler material is melted in the molding hole 46 of the molding jig 45 and the spacer 25 formed of the filler material is provided on a surface of the second member 20. In this case, the molding hole 46 is formed in a tapered shape, and therefore, the molding jig 45 can be easily removed after the filler material is solidified.

The outer peripheral portion of the spacer 25 is formed in a tapered shape so as to correspond to the tapered shape of the molding hole 46. The central portion of the spacer 25 is formed in a curved shape protruding upward by a surface tension acting during welding. Therefore, the central portion of the spacer 25 is higher than the outer peripheral portion thereof.

Note that, in performing arc welding, the feeding amount of the filler material needs to be adjusted such that the height of the central portion of the spacer 25 is smaller than the plate thickness of the third member 30.

Figure 11:
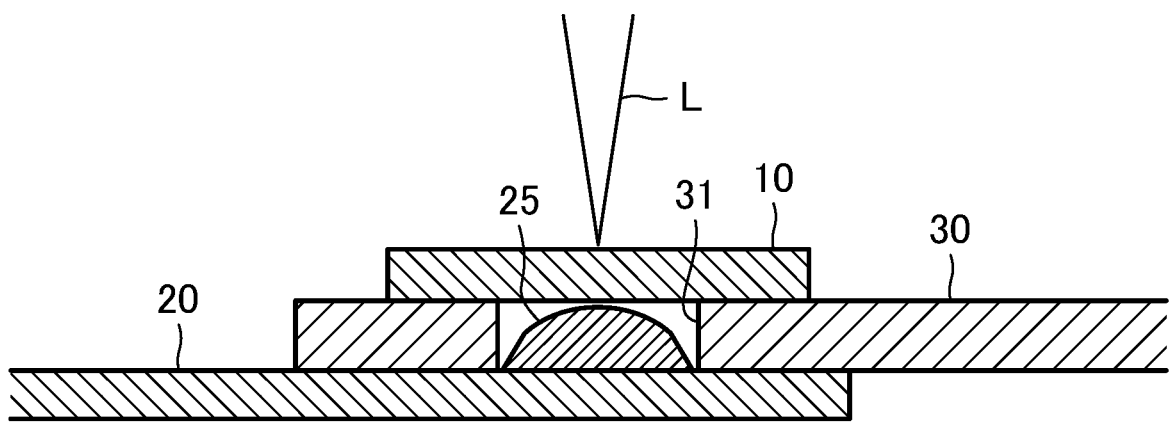
FIG. 11 is a side cross-sectional view illustrating the joining structure before laser welding.

Next, as illustrated in FIG. 11, the first member 10 is placed on the upper surface of the third member 30 and, with the spacer 25 inserted in the through hole 31 of the third member 30, the third member 30 is interposed between the first member 10 and the second member 20. In this case, the height of the central portion of the spacer 25 is smaller than the plate thickness of the third member 30, and therefore, a gap is provided between the first member 10 and the spacer 25.

Then, the laser light L is radiated to the region of the first member 10 which corresponds to the spacer 25, and thus, the welded portion 40 that is continuous to the first member 10, the spacer 25, and the second member 20 is formed. Thus, the first member 10 and the second member 20 are joined via the spacer 25.

Figure 12:
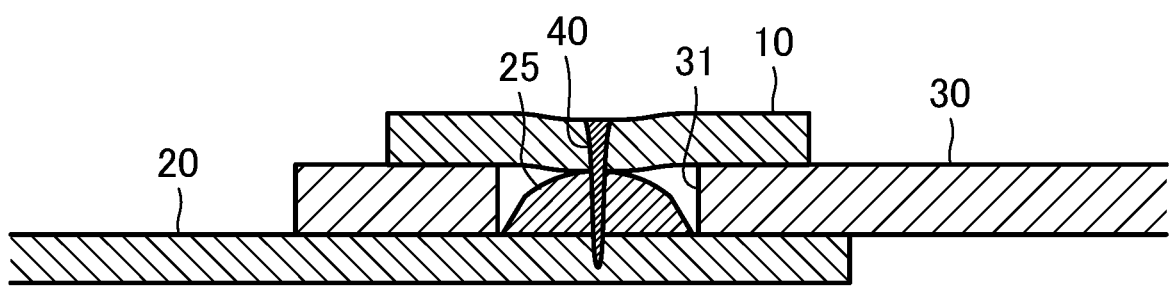
FIG. 12 is a side cross-sectional view illustrating the joining structure after welding.

At this time, as illustrated in FIG. 12, the molten metal of the welded portion 40 is solidified and shrunk, so that the first member 10 is warped, and thus, the gap between the first member 10 and the spacer 25 is reduced. Therefore, the third member 30 as a material of a different type can be compressed and fixed between the first member 10 and the second member 20 that are metal materials of the same type.

Other Embodiments

Each of the above described embodiments may have a following configuration.

In the above described embodiments, laser welding is performed, and thus, the welded portion 40 that is continuous to the first member 10, the spacer 25, and the second member 20 is formed. However, the present disclosure is not limited thereto.

Figure 13:
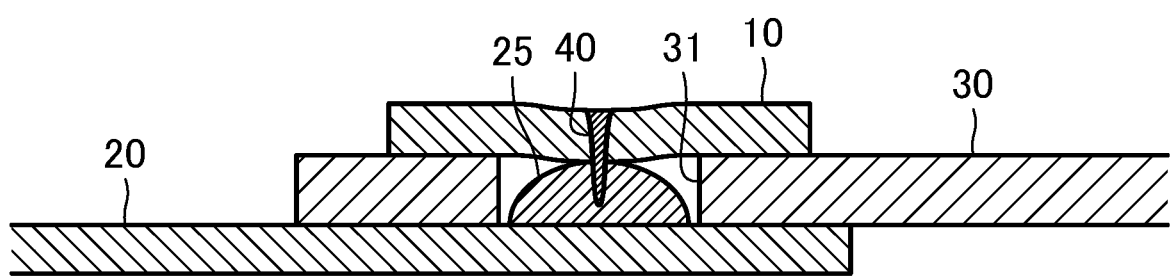
FIG. 13 is a side cross-sectional view illustrating a joining structure according to another embodiment.

For example, as illustrated in FIG. 13, the welded portion 40 that is continuous to the first member 10 and the spacer 25 may be formed by radiating the laser light L from a side in which an upper surface of the first member 10 is located. By joining the first member 10 to at least the spacer 25 in the above described manner, the first member 10, the second member 20, and the third member 30 can be joined to each other.

In the above described embodiments, the spacer 25 is provided only in the second member 20, but the spacer 25 may be provided also in the first member 10.

In the above described embodiments, arc welding is performed on the second member 20, and thus, the spacer 25 formed of the filler material is provided. However, the spacer 25 may be provided, for example, by performing laser filler welding.

As described above, according to the present disclosure, a highly practical effect that metal materials of the same type and a material of a different type can be joined without reducing thicknesses of the metal materials can be achieved, and therefore, the present disclosure is very useful and has high industrial applicability.

What is claimed is:

1. A joining structure, comprising:
   a first member formed of a metal material;
   a second member formed of a metal material of a same type as that of the first member which can be welded to the first member; and
   a third member formed of a material that is different from the first member and the second member,
   the first member, the second member, and the third member being jointed to each other, wherein
   the second member is provided with a spacer formed of a filler material that is joined to a surface of the second member which faces the first member and formed such that a central portion of the spacer protrudes toward the first member more than an outer peripheral portion of the spacer,
   a through portion in which the spacer is inserted is formed in the third member,
   the first member is welded to at least the spacer, in a state in which the spacer is not solidified and is inserted into the through portion such that a thickness of the central portion of the spacer is larger than a thickness of the third member and the third member is interposed between the first member and the second member, and
   in a state in which the first member is welded to at least the spacer, the central portion of the spacer protrudes toward the first member more than the outer peripheral portion of the spacer.

2. The joining structure of claim 1, wherein
   the first member is welded to at least the spacer in a state in which a region of the first member which corresponds to the spacer is warped toward the spacer.

3. A joining method,
   in which a first member formed of a metal material, a second member formed of a metal material of a same type as that of the first member which can be welded to the first member, and a third member formed of a material that is different from the first member and the second member are joined to each other, and
   a through portion is formed in the third member, the joining method comprising:

providing a spacer formed such that a central portion of the spacer protrudes more than an outer peripheral portion of the spacer by melting a filler material to join the filler material to the second member;

arranging the first member such that the third member is interposed between the first member and the second member in a state in which the spacer is inserted into the through portion of the third member; and welding the first member to at least the spacer by radiating laser light to a region of the first member which corresponds to the spacer, wherein in the providing of the spacer, the filler material is melted such that a thickness of the central portion of the spacer is larger than a thickness of the third member, and the arranging of the first member such that the third member is interposed between the first member and the second member is performed after the filler material is melted and before the filler material is solidified, and the central portion of the spacer protrudes toward the first member more than the outer peripheral portion of the spacer.

4. The joining method of claim 3, wherein in the providing of the spacer, the filler material is melted in the through portion in a state in which the third material is placed to overlap the second member.

5. The joining method of claim 3, wherein in the welding of the first member to at least the spacer, when a temperature of the spacer is equal to or lower than a melting point and equal to or higher than 100° C., laser light is radiated.

6. The joining method of claim 3, further comprising:

preparing a molding jig provided with a molding hole passing through the molding jig in a thickness direction and having a hole diameter that gradually increases from one surface to another surface and formed of a material having a melting point that is higher than that of the filler material, wherein in the providing of the spacer, in a state in which a surface of the molding jig at which the hole diameter of the molding hole is larger is placed on the second member, the filler material is melted in the molding hole, and thereafter, the molding jig is removed.

* * * * *